Nov. 11, 1952          A. H. INGALLS          2,617,354

JUICE AND OIL EXTRACTION MACHINE

Filed Jan. 18, 1947          6 Sheets-Sheet 1

Inventor,
Arthur H. Ingalls.
by Hugo C. Kemman
Attorney.

Nov. 11, 1952   A. H. INGALLS   2,617,354
JUICE AND OIL EXTRACTION MACHINE
Filed Jan. 18, 1947                             6 Sheets-Sheet 2

Inventor
Arthur H. Ingalls,
by Hugo G. Kemman
Attorney.

Nov. 11, 1952 A. H. INGALLS 2,617,354
JUICE AND OIL EXTRACTION MACHINE
Filed Jan. 18, 1947 6 Sheets-Sheet 3

Nov. 11, 1952     A. H. INGALLS     2,617,354
JUICE AND OIL EXTRACTION MACHINE
Filed Jan. 18, 1947     6 Sheets-Sheet 5

Inventor
Arthur H. Ingalls
by Hugo G. Kemman
Attorney.

Nov. 11, 1952     A. H. INGALLS     2,617,354
JUICE AND OIL EXTRACTION MACHINE Filed Jan. 18, 1947     6 Sheets-Sheet 6

Inventor:
Arthur H Ingalls
by Hugo A Kennan
Attorney

Patented Nov. 11, 1952

2,617,354

UNITED STATES PATENT OFFICE 2,617,354

JUICE AND OIL EXTRACTION MACHINE

Arthur H. Ingalls, Nairobi, Kenya Colony, assignor to The Sharples Corporation, Philadelphia, Pa., a corporation of Delaware Application January 18, 1947, Serial No. 722,872

10 Claims. (Cl. 100—105)

This invention relates in general to improvements in apparatus for extracting juice from juice-bearing organic matter such as fruits and vegetables. It relates more particularly to novel apparatus for expressing juice from fleshy and juicy fruits and vegetables, for example, from citrous fruits, such, as oranges, lemons, limes, grapefruit, and from fruits or vegetables of similar generally roundish, oblong, cylindrical, or conical shape and physical structure as to which pressure applied to the outside will expel the juice. For example, the invention is adapted to expressing the juice from passion fruit. Should the rind or skin contain oil, such as, in the case of citrous fruits, such oil is preferably expressed at the same time, but in a manner to keep the same segregated from the juice.

All citrous fruits, for example, have an external rind or skin which contains oil cells and pigments. Beneath this rind is a layer of spongy absorbent material known as the albedo. The juice of the fruit is retained in a multiplicity of sacs held in membranous material distributed throughout the interior of the fruit.

While it is a relatively simple matter to extract or express the juice from some fruits and vegetables, it is much more difficult in many cases, particularly in the case of citrous fruits, to remove the juice without contamination, because the rind and/or albedo portions contain oils and flavoring substances which effect the palatability of the juice detrimentally even if present in the juice in very small quantity. Particularly, these substances foreign to the juice have a deleterious effect on juice which is packed (e. g., canned) for long periods of storage before consumption. Therefore, the invention will be discussed more particularly as applied to citrous fruits although its features are equally applicable to other fruits and vegetables, especially of the types more particularly referred to above.

Prior art methods for extracting or expressing juice free from oil and other undesirable substances have been characterized by the complexity of the apparatus employed. Usually these methods have required that sections of the fruit be handled between individual cooperating members which have penetrated into the fruit sections, broken the juice sacs, and squeezed out the juice. The volume of juice which can be extracted in this fashion is a function of the number of separate extractor members which are employed; thus, large volume machines have required a great number of parts. Further, most of the former machines have not been readily adaptable to different sizes of fruit; separate machines have been required to extract juice from pieces of fruit which varied widely in size. Particularly, these machines would not handle both grapefruit and lemons. While simpler methods of extracting or expressing juice have been devised, they have usually produced a juice of low quality because of the impurities mixed with it.

Previous attempts to recover both the juice and oils of citrous fruits have followed a pattern of individual recovery of either oil or juice followed by another operation in which the remaining fluid is collected from the pulp material of the fruit. For example, perforating devices have been used which break the oil cells of the skin, but do not penetrate beyond the oil-bearing cells, to remove the oil from fruit prior to extraction of the juice. In other processes, the juice is extracted first and the rind sections removed for separate treatment to obtain the oil.

While previous methods of extracting oil from citrous fruit have been relatively simple in the steps of breaking the cells and releasing the oil, they have been complicated by the necessity for freeing the oil of contaminating materials which gather on the surfaces of the fruit or from liquids which must be used to carry off the oil. Furthermore, as mentioned above, they involve an additional step of treatment coming either before or after the extraction of the juice.

It is an object of this invention to provide an apparatus for the extraction of juice and/or oil from juice-bearing organic substances, such as citrous or other fleshy fruit or vegetables, which will recover a greater percentage of the available juice from the object treated and obtain this juice substantially free of oil and other foreign substances.

A second object of the invention is to provide a simple machine for the extraction of juice having a minimum number of moving parts and adaptable without modification to a very wide range of sizes of such juice-bearing objects.

Another object of the invention is to extract the juice in a manner which preferably will not permit it to contact the outside of the juice-bearing object or any part of the apparatus which touches the outside of said object. This is partly to avoid oil admixture with the juice and partly to avoid contamination of the juice with mold spores, bacteria, spray residues and gross dirt.

A further object is to reduce or avoid grinding or macerating action upon the membranous and albedo portions, such as, of a fruit, before the juice has been removed in order to avoid introducing undesirable materials into the juice.

A further object is to recover a substantial portion of the oil from the rind or skin, such as, of a fruit, at the same time that the juice is extracted and to obtain this oil substantially free from foreign substances.

A further object of the invention is to provide an apparatus for the extraction of juice which may be easily maintained in a hygienically clean condition.

The apparatus and process of the present invention generally involves the feeding of whole juice-bearing objects or sections thereof to continuously moving pressing surfaces, the squeezing of the juice from these sections and discharging it preferably under mild centrifugal force without permitting contact between the juice and exterior portions of the sections. Preferably they also involve the breaking of the oil cells in the rind simultaneously with the extraction of juice, and the removing of the oil from the surfaces to which it adheres, such as, of the sections and of the apparatus, without admixture with the juice or undesirable foreign substances.

In a particular embodiment of the invention, sections, such as, of fruit or vegetables, are fed down an inclined chute into a space between opposed surfaces of adjacent squeezing members which are mounted on, and rotate about, oblique axes in a manner so that said surfaces converge over a portion of their path, such as the lower portion, and diverge over another portion of their path, such as the upper portion. The fruit sections are fed into said space in a manner such that their outer surfaces or rind portions are engaged by the opposed surfaces of the rotating members as said surfaces converge so as to carry the sections of fruit to and through the point of closest convergence of said surfaces. Such engagement of the fruit sections is such that the cut faces of the fruit sections are aimed more or less and preferably radially outward, and as a consequence of the converging action of said surfaces the juice is squeezed out of the engaged sections and discharged outwardly, usually under mild centrifugal force depending upon the speed of rotation. The squeezing action is preferably such that the oil cells in the rind are broken as the sections are squeezed and oil which adheres to the opposed surfaces may be removed therefrom by a scraper or wiper. Preferably, however, the opposed squeezing surfaces are perforated and oil which is expressed from the rind or skin of the fruit or vegetable is removed through the perforations in said squeezing surfaces by the application of reduced pressure such as by a vacuum collector connected to said surfaces through said perforations. Any such operation for the removal of both juice and oil is preferably completed by the time that the rotating members have carried the sections through the point of closest convergence so that the rind or skin, pulp and rag of the fruit or vegetable may be discharged into a separate receptacle, or otherwise disposed of, as the surfaces of the rotating members diverge and the squeezing action comes to an end.

Other objects, features and advantages of the invention will become apparent to those skilled in the art after study of the following detailed description and the attached drawings in which.

In the embodiment illustrated in Figures 1 through 5, a frame member 10 supports upright members 11 and 12. Mounted on these upright members which as shown are not of the same height, are the bearings 13 and 14 which support the carrier members or yokes 15 and 16. Since the upright members 11 and 12 as shown are not of the same height, the yokes 15 and 16 lie in a plane at an acute angle with the horizontal. While this arrangement simplifies feed and discharge problems, it is not essential to the operation of the machine within the scope of the invention.

Uprights 17 and 18 extend outwardly, such as, perpendicularly from the yokes 15 and 16 respectively. These uprights are held apart under the pressure of a spring 19 which acts against socket members 20 and 21 connected to the uprights 17 and 18 respectively. A guide rod 22 may be pivotally mounted in member 17 on a pin 23. A stop nut 24 threaded on the rod 22 engages a portion of the socket 21 on the upright 18. By the connection afforded through the guide rod 22, the connecting pin 23 and stop nut 24, divergence of the upright members 17 and 18 under pressure of the spring 19 is limited to the adjusted length of the guide rod 22. The spring tension may be adjusted by the cooperating members 25 and 26 which may be moved on a threaded surface of the guide rod 22. The member 26 serves to lock the member 25 in position after adjustment of the spring tension has been made through movement of the member 25.

Link members 27 and 28 attached to the connecting link 29 insure against unequal movement of the yokes 15 and 16 under the pressure of the spring 19. The link member 27 is pivotally mounted to the yoke 16, and the link member 28 is pivotally mounted to the yoke 15. The opposite ends of each of these link members are pivotally connected to an end of the connecting link 29. The other end of this connecting link 29 is pivotally mounted on the upright frame member 11.

Two circumferential squeezing members 30 and 31 are connected to shafts 32 and 33 which are rotatably mounted by means of bearings 34 and 35 in the yoke members 15 and 16. The squeezing members 30 and 31 as shown are each formed with an annular ring 36 supported by spokes 37; they may be any other convenient form such as solid discs or frusto-conically edged cylinders. It will be seen that the squeezing members 30 and 31 are so mounted that when the yokes 15 and 16 are moved downwardly the squeezing members tend to converge closely at a zone 38 and to diverge widely at a zone 39 diametrically opposite the zone 38. Under the action of the spring 19, the yoke members 15 and 16 are normally forced out of alignment so that the squeezing members 30 and 31 are supported obliquely with an acute angle between them. The annular surfaces 40 and 41 of the squeezing members 30 and 31 as shown are placed at a slight angle to the facial planes of the squeezing members. This angle is selected to bring the annular surfaces 40 and 41 of the squeezing members into a more or less relatively parallel position as they pass through the zone 38 of closest convergence.

It will be seen that the annular surfaces 40 and 41 engage any material which is to be squeezed between the squeezing members 30 and 31. The force applied in squeezing this material is determined by the adjustment of the spring 19 which tends to force the surfaces 40 and 41 into contact with each other at the zone of closest convergence 38. As shown, contact between the surfaces is prevented by the limiting action of the guide rod stop nut 24 and associated parts. It will be seen that by adjustment of the nut 24 any desired spacing between the surfaces 40 and 41 at the point of closest convergence 38 may be obtained. If desired, for any reason, stop nut 24 may be eliminated or adjusted to permit contact between said surfaces. However, it is usually desired to provide such spacing among other things to limit the ultimate squeezing action on the object being pressed or squeezed to avoid or guard against possible undue crushing or disintegration of the rind and/or albedo portions. As other methods of applying and/or limiting the pressure tending to force the surfaces 40 and 41 into contact will be apparent to those skilled in the art upon becoming familiar herewith, the means described is not a limitation of the invention but is shown because of its simplicity and convenience.

Figure 1:
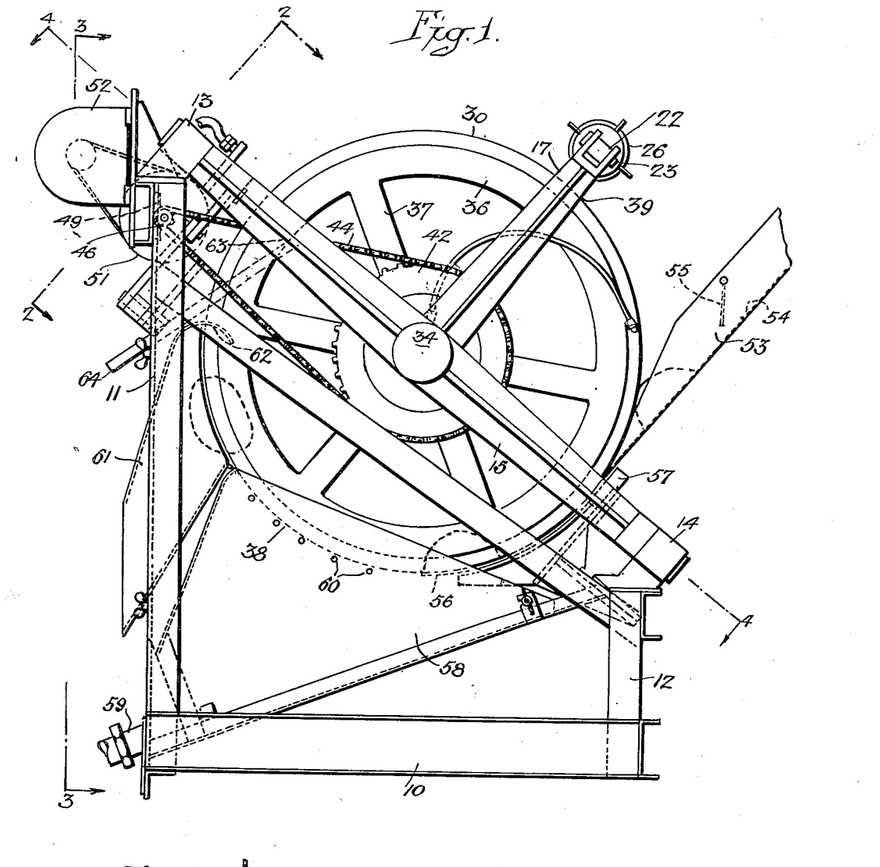
Figure 1 is an elevation of a preferred embodiment of the invention.
Figure 2:
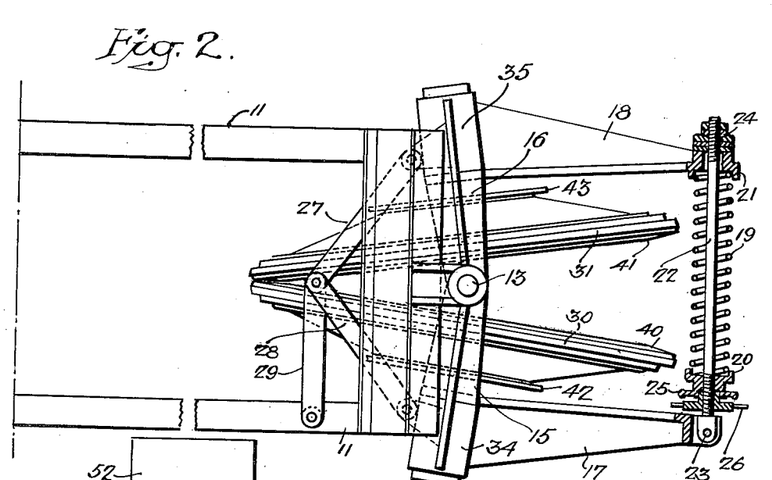
Figure 2 is a projected view taken along the line 2—2 in Figure 1.
Figure 3:
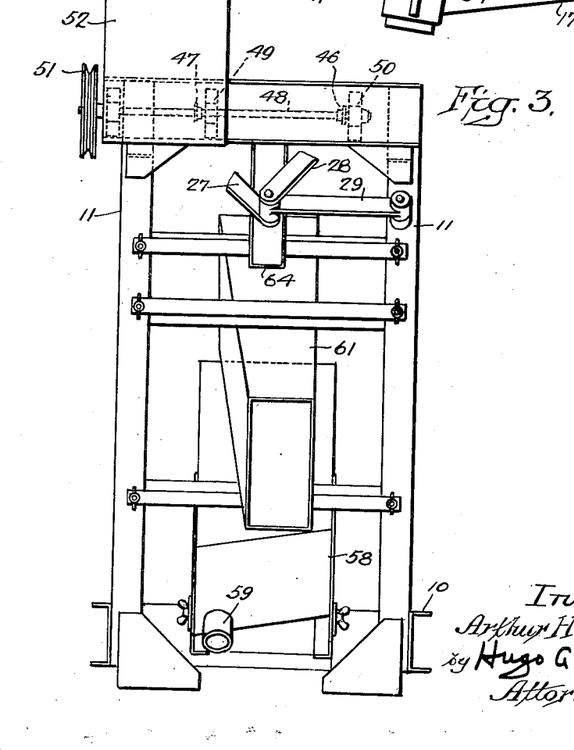
Figure 3 is an end view taken along the line 3—3 in Figure 1.
Figures 5, 9, 10:
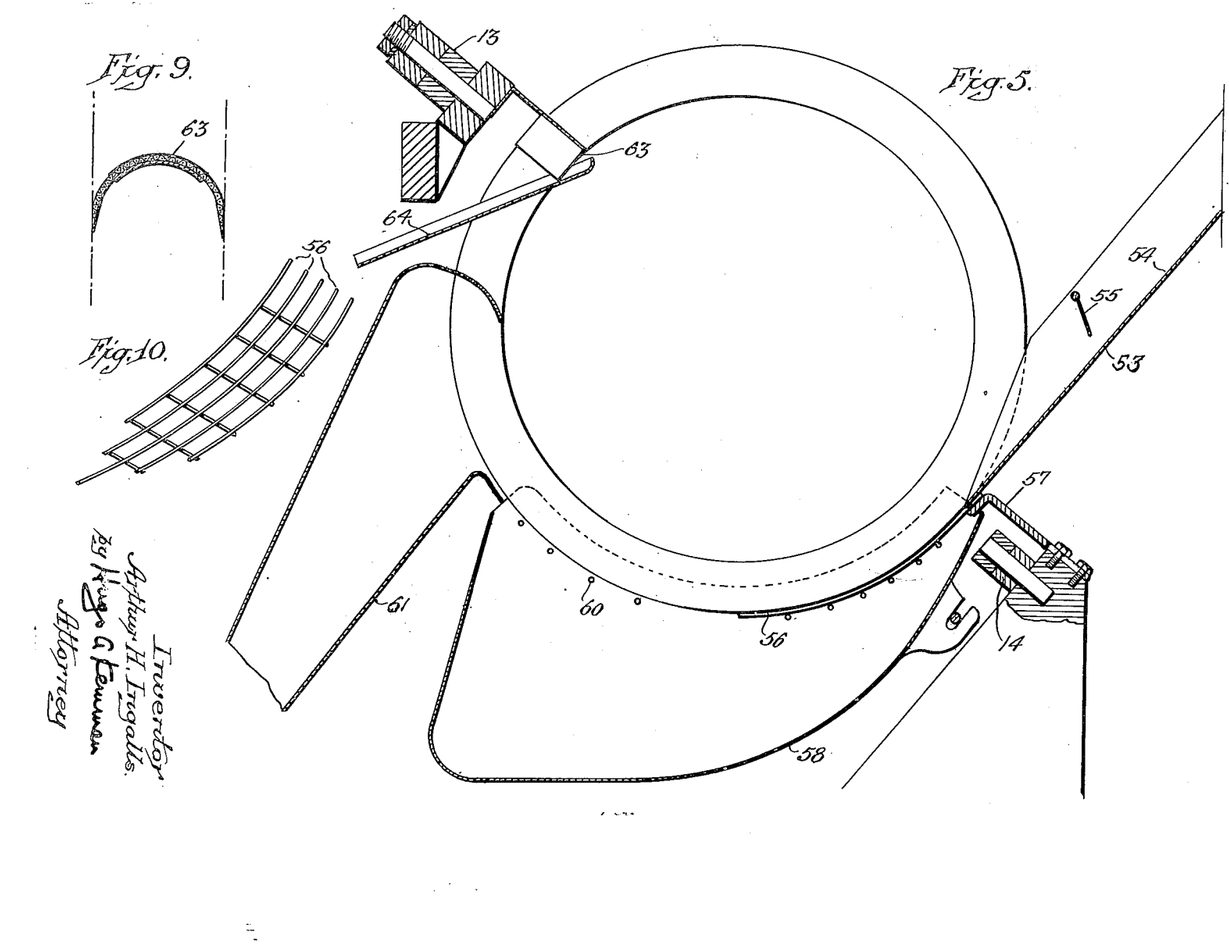
Figure 5 is a diagrammatic view partly in section showing details of construction of the component parts of the machine.
Figure 9 is a cross section of one embodiment of the wiper member shown in Figures 1 and 5.
Figure 10 is a plan view of the fruit guide bars.

The squeezing members 30 and 31 which are conveniently circular are rotated, in a clockwise direction as shown in Figures 1 and 5, through a drive connected to the sprockets 42 and 43. This rotation develops mild centrifugal force at the peripheries of the squeezing members and conveys material engaged between the surfaces of the squeezing members through a portion of a revolution. Chains connect these sprockets 42 and 43 to driving sprockets 46 and 47 mounted on a jack shaft 48. Chain 44 connecting sprocket 42 to sprocket 46 is illustrated in Figure 1. This jack shaft may be supported in suitable bearings 49 and 50 mounted between the upright frame members 11. A pulley 51 suitably connected to a source of drive such as the motor 52, rotates the jack shaft 48 and the attached sprockets 46 and 47.

Figure 13:
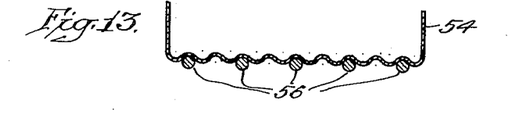
Figure 13 is a cross section at a point closely adjacent to the squeezing members of a preferred feed chute for the apparatus.

Cut sections such as of citrous fruit are fed toward the rotating squeezing members 30 and 31 down a suitable feed chute 53 illustrated in Figures 1 and 5. The cut surfaces of the fruit sections are placed in contact with a bottom slide 54 of the feed chute 53. As shown, this slide 54 has longitudinal corrugations (see Figure 13) which reduce the friction between the slide surface and the cut surfaces of the fruit sections and also overcome the tendency of half fruit to form a vacuum between the cut surface and an opposing flat surface. A resiliently mounted fruit aligning baffle 55 may be placed in the feed chute 53 to insure that the fruit sections are fed to the squeezing members individually and to overturn sections of fruit which may have their cut surfaces aimed upwardly.

As the fruit sections pass in between the annular surfaces 40 and 41 of the squeezing members, the rind or skin of the fruit section is engaged by these annular surfaces. The fruit section is carried with the peripheries of the squeezing members toward the zone 38 of convergence of the surfaces of the squeezing members. As the surfaces 40 and 41 of the squeezing members converge, the fruit is pressed between them and the juice discharged radially outwardly from the circumference of the circular squeezing members.

As the fruit is in the bottom portion of the paths of the surfaces 40 and 41, gravity aids in the discharge of the juice. Likewise, a carefully controlled centrifugal force assists in throwing off juice from fruit surfaces to which it adheres after the juice sacs have been broken by the squeezing pressure. The centrifugal force which is applied may be adjusted by changing the speed of rotation of the squeezing members. It has been found that very satisfactory results may be obtained when the centrifugal force applied for bottom discharge of juice has a value equal to between 0.2 and 1.0 times the force of gravity although operations may be carried out successfully in a wider range of centrifugal force. The centrifugal force applied is preferably not too great, or it will cause oil from the cells in the skin of the fruit to be discharged into the juice collector. Under mild centrifugal force this oil will adhere to the skin of the fruit and to the surfaces 40 and 41 and will not be discharged until other measures are taken to dislodge it.

Guide rods or bars 56 extending circumferentially around the portions of the squeezing members which follow the feed zone hold the fruit section within the peripheries of the squeezing members and prevent or limit extrusion of the rag portions of the fruit as the annular surfaces 40 and 41 converge and squeeze the fruit between them. (See Figure 10 for a plan view of these bars.) These guide bars 56 may be mounted in an adjustable bracket 57 from which they are cantilevered downwardly. The adjustable mounting permits variation of the distance between the guide bars and the peripheries of the squeezing members. The cantilever method of mounting tends toward resiliency in the guide rods so that inequalities in the amount of expressed pulp of the fruit sections will be compensated for.

A juice collecting pan or trough 58 is adjustably mounted on the frame member 10 and the upright 12 underneath the squeezing members 30 and 31. A conduit 59 carries the juice away from this collecting pan for subsequent treatment. Knocker bars 60 run laterally across the juice collecting pan at points adjacent to the peripheries of the squeezing members 30 and 31. The distance between these knocker bars and the peripheries of the squeezing members may be varied through adjustment of the mounting of the juice collecting pan. The knocker bars serve to extract juice which may remain in the rag portions of the fruit which have been squeezed out of the fruit sections as they pass, while between the annular surfaces 40 and 41, through the zone 38 of closest convergence of these surfaces.

Rind and pulp portions of the fruit remain engaged between the annular surfaces 40 and 41 of the squeezing members until they start to diverge. They are disengaged by these surfaces after said surfaces have diverged sufficiently to release said portions, whereupon said portions drop and are discharged down a discharge chute 61 mounted on the upright members 11. A curved portion 62 of this rind and pulp discharge chute 61 serves to catch solid material which may be still engaged with the annular surfaces 40 and 41 and to direct these solid materials down the rind and pulp discharge chute 61. A resilient wiper 63 (see Figure 5) contacts each of the annular surfaces 40 and 41 and wipes or scrapes off any residual material which may remain on these surfaces. This residual material which usually comprises oil and/or semi-solid waxy matter is discharged down a trough 64 which is also mounted on the upright members 11.

Figures 4, 4A:
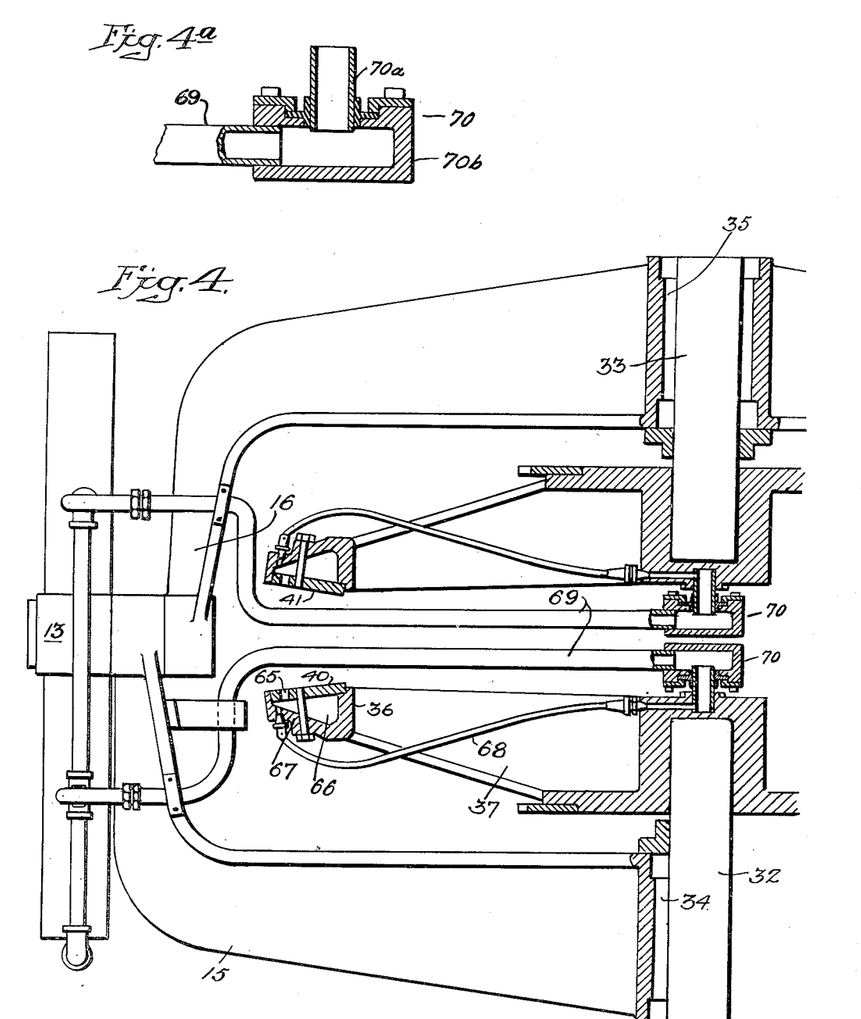
Figure 4 is a sectional view along the line 4—4 of the embodiment shown in Figure 1.
Figure 4a is an enlargement of the vacuum connection shown in Figure 4.

While some oil from the oil cells located in the rind of the citrous fruit may be collected by the wiper 63, the machine is preferably adapted to separate and collect at least the bulk of this oil in a more satisfactory manner by adoption of the following modifications. Referring now more particularly to Figures 4 and 4a, as shown, surface 40 is perforated with numerous small openings 65 connecting into a chamber 66 formed between housing member 67 and the annular surface piece 40. One or more vacuum (reduced pressure) lines 68 which rotate with the squeezing member connect to a stationary vacuum (reduced pressure) line 69, connected to a source of vacuum (reduced pressure) not shown, through a suitable rotating coupling 70. Coupling 70, as shown, comprises a hollow journal 70a which is fixedly mounted at one end in the squeezing member, and a stationary hollow bearing member 70b which is secured to and connects with vacuum line 69. Hollow journal 70a in turn connects with vacuum line or lines 68. The rotating fit between journal 70a and bearing 70b is of course preferably such as to prevent, or hold to a minimum, any leakage.

The air drawn into the chamber 66 by virtue of the reduced pressure will carry with it oil expressed in the form of spray or fog due to the squeezing action, as well as oil which adheres to the surface 40 and/or to the outer skin of the fruit section after the oil cells of the fruit have been broken by the squeezing action of the converging annular surfaces 40 and 41. This oil is carried out through lines 68 and 69 by and along with the in-rushing air, and is collected at a suitable point (not shown) in the vacuum (reduced pressure) collection mechanism. Corrugations or other irregular surface configurations, on the surface 40 will aid in breaking the oil cells in the rind of the fruit as it passes between the converging surfaces.

As illustrated in Figure 4, surface 41 and its associated parts are similarly constructed, and it will be understood from the foregoing that one or both of the annular surfaces 40 and 41 may be perforated and connected to a source of vacuum. Likewise, one or both of these surfaces may be corrugated or otherwise constructed. For convenience of description, the details of only one member have been particularly described, but the description is equally applicable to both.

Figure 8:
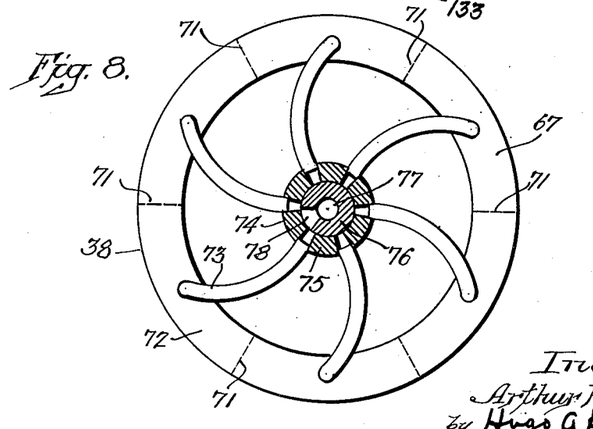
Figure 8 is an elevation partly in section illustrating a modification of the squeezing members.

Referring now to the modification shown in Figure 8, to apply the vacuum at the point at which it is most needed to collect oil and to reduce the requirements on the source of vacuum, a number of walls 71 are illustrated as positioned between the housing member 67 and the surface 40 of Figure 4 to divide the annular chamber 66 into a number of segments such as illustrated at 72. Each of these segments 72 may be connected through a separate conduit 73 to a distributor member 74 which is in turn connected through a stationary vacuum line to a source of vacuum (not shown). The distributor member 74 connects the conduits 73 of the respective segments 72 when immediately adjacent to the zone 38 of convergence of the annular surfaces to the source of vacuum. Thus a strong vacuum is applied at the point of initial collection of oil, and vacuum is not applied to the respective segments 72 as they pass through those portions of their circular paths in which no oil is being expressed. As a result the vacuum (low pressure) equipment is placed under less of a load.

The action of the distributor member 74 will be understood when it is noted that an outer casing 75 rotates with the respective squeezing member. An inner section 76 is stationary; this inner section 76 connects through a conduit 77 to a source of vacuum. A port 78 in the inner section 76 connects the conduit 77 consecutively with the respective conduits 73 of the respective segments 72 as these conduits 73 successively come into alignment with the port 78. The port 78 is so located that the conduits 73 connecting those segments 72 closest to the zone 38 of convergence of the annular surfaces are subjected to the vacuum.

From the foregoing description, it will be seen that in the embodiments of the invention so far particularly described, halves of fruit, such as of oranges, slide down the feed chute 53 (Figure 1 and Figure 5) under the force of gravity. If the cut surface of the fruit half is not down, that is in contact with the slide 54, it will be overturned by the resiliently mounted fruit aligning baffle 55. This baffle also serves to maintain a line of fruit halves of a single height so that said halves are fed to and engaged by the squeezing members 30 and 31 individually.

When the fruit halves reach the end of the feed chute 53 they pass on to the guide bars 56 and continue to descend until eventually the skin of the half is engaged between the annular surfaces 40 and 41 of the squeezing members 30 and 31 as they converge. The guide bars 56 hold the fruit within the peripheries of the squeezing members and as the squeezing action starts minimize the extrusion of the central portions of the fruit. As the fruit half reaches the zone 38 of closest convergence of the surfaces 40 and 41, its juice content is almost completely squeezed out. The knocker bars 60 serve to extract juice from the rag portions of the fruit which have extruded beyond the peripheries of the squeezing members, such rag portions striking against bars 60 with resulting expression or knocking of juice from the rag portions.

Meanwhile, any corrugations, perforations, and/or other suitable configurations on the surfaces 40 and 41 have assisted in breaking the oil cells in the skin of the fruit, and this oil has been collected by virtue of the rush of air through the perforations 65 carrying the oil with it. The oil is carried out through the stationary vacuum lines 69 to a collection point which is not shown.

As the remainder of the fruit half in its flattened condition passes beyond the zone 38 of closest convergence of the squeezing members, it is eventually released from engagement with the surfaces 40 and 41 and falls away through the skin discharge chute 61. The baffle 62, shown conveniently as curved, serves to dislodge fruit which tends to adhere to the surfaces 40 and 41. Oil and other material, such as waxy solids, which remain on the surfaces 40 and 41 are wiped off by the double action wiper 63. The oil and other material collected by this wiper passes from the machine down the trough 64.

Figure 6:
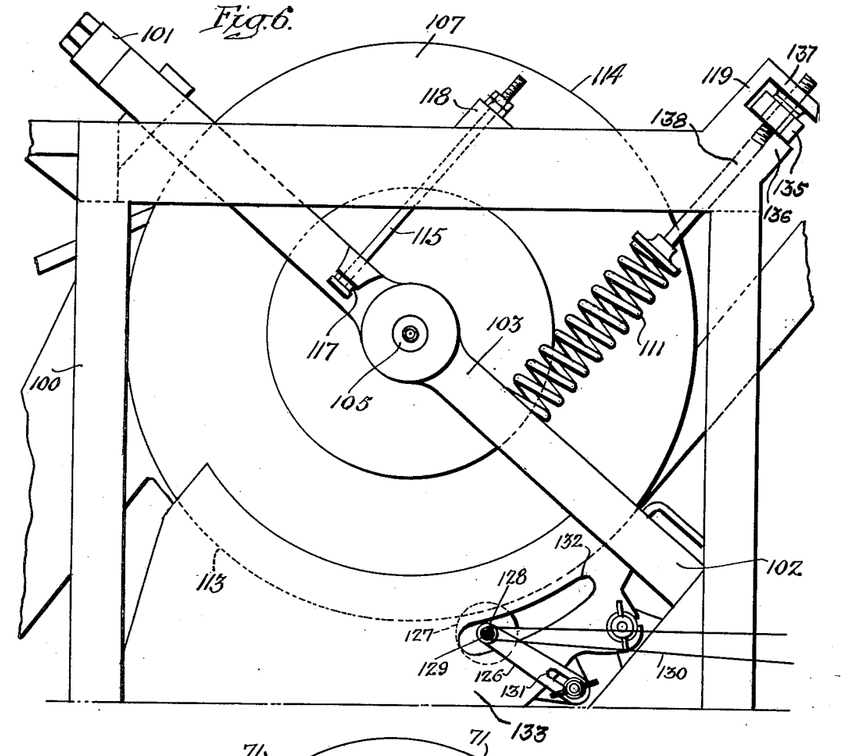
Figure 6 is an elevation of another embodiment of the invention.
Figure 7:
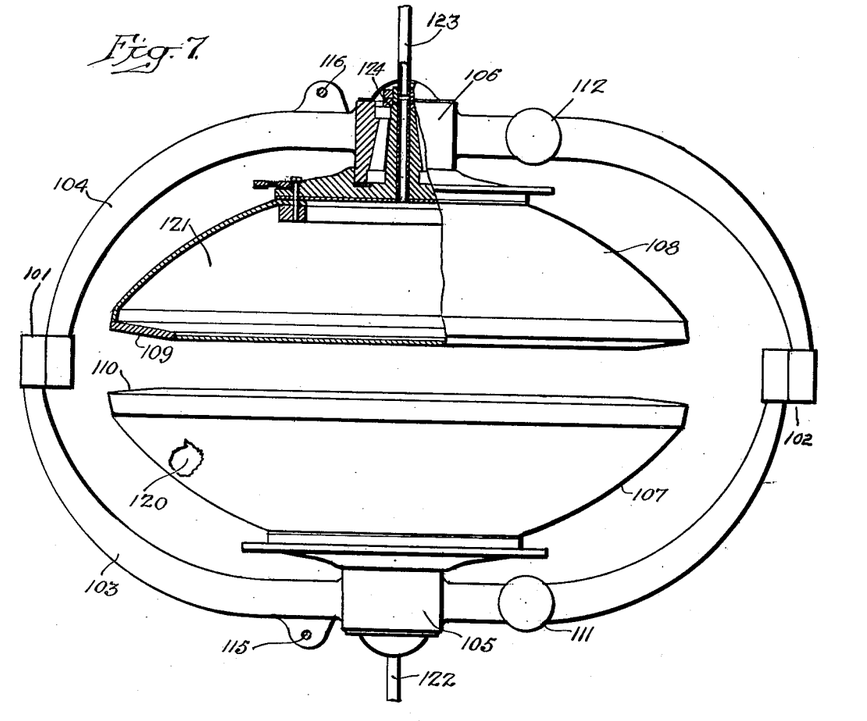
Figure 7 is a top view of the embodiment shown in Figure 6.

An alternative embodiment of the apparatus of the invention is shown in Figures 6 and 7 which includes the fundamental features of the embodiment previously described although these features are modified in form. Additional elements are also included in this second embodiment. As illustrated, the frame 100 supports the journals 101 and 102 on which the yokes 103 and 104 are rotatably mounted. Bearings 105 and 106 are positioned in the yokes 103 and 104 respectively and furnish rotatable mountings for journals on the respective squeezing members 107 and 108, which are shown as bowl-shaped or disc-like.

The annular surfaces 109 and 110 on these squeezing members are positioned angularly to the faces of the squeezing members. Under pressure of the springs 111 and 112, the yokes 103 and 104 are forced out of alignment as they rotate about the journals 101 and 102. This causes the annular surfaces 109 and 110 to converge in a zone 113 and diverge at a zone 114. Convergence of the annular surfaces 109 and 110 in the zone 113 brings them into a relatively more or less parallel position when the yokes are moved under spring pressure as just described, the same as is the case with surfaces 40 and 41 in the embodiment of Figures 1 to 5. The squeezing members become obliquely opposed with an acute angle between their faces as they are carried around with the motion of the yokes described above.

If it is desired to prevent excessive movement of the yokes 103 and 104 which would bring the annular surfaces 109 and 110 into contact at the point of closest convergence in the zone 113 which frequently is preferred to avoid undue crushing of the rind, the stop bolts 115 and 116 may be provided to limit the downward movement of the yokes under pressure of springs 111 and 112. The remaining distance between the surfaces of the squeezing members at the zone of closest convergence 113 is established by adjusting the effective length of the bolts 115 and 116. Shock contacts between the yokes and these stop bolts may be minimized by providing resilient mountings which may be in the form of a rubber annulus 117. The stop bolts as shown are slidably mounted on the frame in a mounting 118.

The squeezing pressure exerted by the annular surfaces 109 and 110 against the fruit which is engaged between them may be regulated by an adjustment of the tension of the springs 111 and 112. This regulation of the spring 111, for example, may be accomplished through an adjustment device 119 which acts to increase or decrease the initial tension in the spring. This device may comprise an adjustment nut 135 rotatably mounted between fixed portions 136 and 137 of the frame 100 and the spring support 138 on which the nut is threaded. It will be seen that rotation of the nut 135 between the fixed portions 136 and 137 will move the spring support 138 to increase or reduce the effective length of the spring 111.

It will be understood that members 107 and 108 may be driven in any desired manner.

It will be understood that in this embodiment, similarly to the previous embodiment, sections of fruit are fed between the converging surfaces 109 and 110 of the squeezing members 107 and 108. As the skin portion of the fruit is engaged by the converging surfaces, the fruit is carried around a portion of a revolution of the squeezing members through the zone 113 of closest convergence of the surfaces of the squeezing members. Juice is squeezed from the juice sacs of the fruit by the force applied by the squeezing members which are impelled by the springs 111 and 112. Mild centrifugal force developed by the rotation of the squeezing members assists in discharging the juice. Oil from the oil cells in the skin of the fruit remains on the surfaces 109 and 110 to be collected by a wiper member or as hereinafter described. As the surfaces of the squeezing members diverge, the skin and pulp of the fruit are disengaged from these surfaces and discharged from the machine, for example, as illustrated in connection with Figures 1 to 5.

Figure 11:
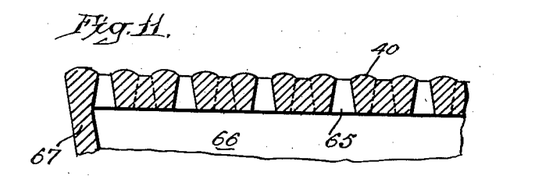
Figure 11 is a fragmentary enlargement of one embodiment of the pressing surface of a squeezing member.

The annular surfaces 109 and 110 may be perforated the same as in the previous embodiment if desired. Perforations of this character are conveniently enlarged toward the back as shown in Figure 11. Likewise, surfaces 109 and 110, the same as in the previous embodiment, may be corrugated or otherwise configurated circumferentially or radially, or both, or otherwise, in order to exert a more localized squeezing action on the oil cells of the fruit. The configurations of the opposed surfaces may intermesh; that is, raised portions of one surface may register with relieved portions of the other surface and vice versa, or matching configurations, flat or other suitable surfaces may be used.

Air and entrained oil may be drawn in through perforations (not illustrated) in the annular surfaces 109 and 110, the same as in the previous embodiments, by causing a reduction of pressure in the interior chambers 120 and 121 of the squeezing members 107 and 108 into which such perforations would open. The air and entrained oil are then carried out of the chambers 120 and 121 to a source of reduced pressure which is not illustrated. Fluid connections from the chambers 120 and 121 to the source of reduced pressure are made through conduits 122 and 123. As illustrated, conduit 123, which is non-rotating, has a fluid connection with the interior of the chamber 121 through a suitable rotating fitting or journal 124, upon which squeezing member 108 is mounted, and which closely surrounds a portion of conduit 123 in sealing relationship thereto. Any well known sealing connection for the passage of fluid from a rotating conduit into a non-rotating may be used here. The fluid connection from chamber 120 to conduit 122 through the bearing 105 may be constructed in a similar manner.

Distributor members similar to the distributor 74 which was previously described could be adapted to use in establishing fluid connection between the conduits 122 and 123 to the source of reduced pressure and the interior chambers 120 and 121. It is understood that these chambers would be compartmentalized if this modification were adopted. As previously described, when the distributor member is used a stronger vacuum is applied to the compartment which is adjacent to the zone of initial collection of oil. Vacuum is not applied to those compartments which are in zones in which substantial quantities of oil are not collected.

In some instances, for example in the treatment of limes and small oranges, it is desirable to feed whole fruit between the squeezing members. A rotating circular knife, positioned with respect to the squeezing members so as to slit fruit held thereby, such as shown in Figure 6, has been found desirable in these instances. This knife cuts a slit through the skin of the fruit through which the juice flows as the squeezing pressure is applied. This knife is usually located so that it cuts the fruit shortly after the fruit has been gripped between the converging squeezing members.

As illustrated, this knife 126 includes a circular blade 127 preferably having a sharp edge. This blade 127 is mounted on a shaft 128 which may be rotatably supported in bearing 129. The shaft 128 may be rotated, for instance, clockwise as shown, from a suitable source of power by a connection such as the belt 130. The bearing 129 is shown mounted in one end of a bracket 131 which is adjustably attached at its other end to a portion of the frame 100. A slot 132 in the juice collecting pan 133, through which shaft 128 projects, allows the shaft 128 to be moved circumferentially and/or radially with respect to the squeezing members 107 and 108 when the bracket 131 is adjusted. The knife blade 127, which preferably lies between the squeezing members and which may extend between the annular surfaces 109 and 110, may thus be set at the desired distance from the zone 113 of closest convergence of the surfaces 109 and 110. The blade usually is set at a radial distance from the center of rotation of the discs 107 and 108 such that a slit only sufficiently long to discharge the juice of the fruit freely is cut into each piece (whole fruit) as it passes over the knife blade. However the size of the slit by virtue of the adjustment afforded may be varied considerably as desired.

Wipers, not illustrated, may be placed in contact with the sides of the knife blade to collect oil and other substances which may adhere to the blade as it cuts through the skin of the fruit.

Figure 12:
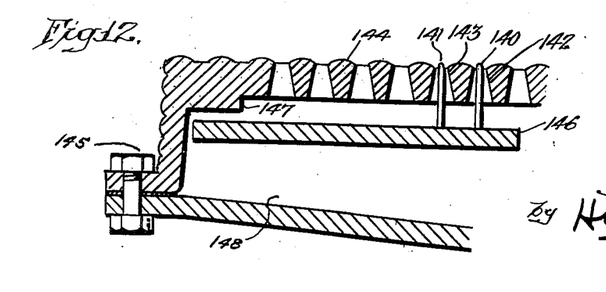
Figure 12 is a fragmentary detail of a modification of the pressing surface of a squeezing member.

Another modification which may be made within the scope of the invention is shown in Figure 12. As illustrated, pins 140 and 141 project through the perforations 142 and 143 in the annular surface 144 of the squeezing member 145. The pins 140 and 141 are mounted on an annulus 146 which may move axially with respect to member 145 to cause the pins 140 and 141 to penetrate the oil cells of the skin of fruit engaged with the surface 144. A stop 147 may be provided to prevent penetration of the pins 140 and 141 into the skin of the fruit beyond the depth of the layer of oil-bearing cells. The chamber 148 formed in the squeezing member 145 may be connected to a suitable source of vacuum not shown. This chamber may be compartmentalized in the fashion previously described in order to reduce the requirements on the source of vacuum.

As used herein, the word "skin" describes that portion of the juice-bearing material which normally protects such material from deterioration in the atmosphere. This machine is preferably so constructed and operated that the skin portion of the juice-bearing material is gripped by the opposed surfaces of the squeezing members. The configuration of the particular juice-bearing material being treated will be considered in the choice of the shape of any section of such material to be handled. The sections are preferably formed in a fashion which will assure gripping of the skin portion by the opposed surfaces of the squeezing members and avoid or limit contact of juice with these surfaces for the reasons pointed out above.

The example of advantageous sections as used in the description has been taken as half fruit or cup-shaped sections because of the convenience of obtaining such sections, and because of the convenient operation of the machine in extracting juice from sections of this character. The term "half fruit" is used herein for convenience, and does not signify that the portion or section is an exact half but merely that it is the result of cutting the fruit once through to form two cup-like portions or sections. Sections of any size and shape may be chosen preferably having in mind the avoidance or limitation of the contact of juice with the opposed surfaces of the squeezing members. Since cutting operations are frequently time-consuming and cumbersome, it is usually convenient to operate the machine in squeezing half fruit sections especially when citrous fruits are being treated. As previously noted, some juice-bearing objects, such as limes, lemons or small oranges, may be treated whole in the machine.

Any desired and suitable force may be applied between and by the squeezing members having in mind the objects and purposes of this invention. It will be evident to those skilled in the art that the forces obtained, for example, as by adjustment of spring tension, should be sufficient to squeeze out the desired portion of the juice in the fruit sections, but preferably should be limited, particularly in the case of oil-bearing skins, to substantially avoid excessive grinding, crushing, or maceration of the skin and other portions, such as the albedo of citrous fruit. The force required to rupture the oil cells may be the determining factor in some cases. For example, a force of 500 pounds has been applied to oranges even though it is recognized that a lesser force would extract the juice, and in most cases at least some oil. Fruits of the genus Passiflora are usually treated with pressures of 200 pounds or less since oil is seldom extracted from the skin of such fruit.

While pretreatment of the fruit or vegetables prior to processing in accordance with my invention is ordinarily not required, it will of course be understood that any desired pretreatment may be made without departing from the spirit of the invention. Thus fruits and vegetables may be washed if desired or otherwise pre-processed. Should the fruit or vegetable have a hard rind or skin such as is the case with passion fruit or grenadillos, I frequently find it desirable to resort to a pretreatment to soften the hard rind or shell. In the case of passion fruit or grenadillos for example, such pretreatment for shell softening purposes may comprise subjecting the fruit to steam at atmospheric pressure for a suitable period depending upon the degree of ripeness such as from 3 to 5 minutes. The softening action prevents the shell from cracking in the machine due to the squeezing action. Cracking of the shell might permit juice to escape through the cracks and on to the surfaces of the squeezing members which is not preferred.

The rate at which the fruit sections such as halves are fed into the machine, other things being equal, will depend somewhat upon the slope of the feed chute such as the feed chute 53 as shown in Figures 1 and 5. It is obvious that the slope of the feed chute may be made adjustable or may be adjusted so that the fruit halves descend through the chute at the desired rate. I find that it is not necessary to space the fruit halves in the feed chute but that the halves may descend, for example, in a single continuous file. If this continuous file moves at a rate which is less than the peripheral speed of the squeezing members, the fruit halves will become automatically spaced as they are gripped by the squeezing members, although spacing of the halves as they are gripped by the squeezing members is by no means necessary. In the case of halves which are not graded as to size, it might be desirable to have the file of halves, particularly when continuous, pass down the feed chute at a slower rate than when the halves are all of the same or similar size. It will of course be understood that the halves may be spaced either manually or mechanically as they are fed into the machine if desired. A variety of means for automatically spacing the halves will become apparent to persons skilled in the art upon becoming familiar with this invention.

An outstanding feature of my invention resides in the fact that it is unnecessary to resort to grading as to size of fruit or vegetables to be treated for expression of juice. Thus the fruit halves descending through the feed chute may be of a wide variety of sizes without entailing any difficulty in the expression of juice and oil therefrom.

However, grading of fruit prior to treatment for the extraction of juice and/or oil may be resorted to if desired and in some cases such as in the processing of whole fruit of which limes are an example, grading prior to processing is frequently desired. In such cases it will be recalled that the fruit is merely snipped or slitted usually at the bottom as it is being held by the squeezing members, and by grading the fruit as to size, the cutting or snipping knife or rotor such as the knife 127 in Figure 6 may be positioned so as to slit or snip the lower edge of the fruit immediately after it is engaged by the squeezing members.

The squeezing members may obviously be of any desired diameter preferably conformable to good engineering design. A machine having squeezing members of a diameter of 39 inches may be given as an example. As pointed out previously, any suitable speed of rotation may be employed. For instance, I have found a speed of 42 R. P. M. very suitable for a machine of the size above indicated, in the expression of juice from orange halves. Such a machine is capable of expressing the juice from orange halves at a rate of approximately 1000 orange halves per minute. The oranges were of a size so as to average four whole oranges to the pound.

As pointed out previously, the speed of rotation is preferably such as to develop some significant centrifugal force to assist in the removal of juice but insufficient to cause any significant amount of foreign matter, including oil, to be thrown from the squeezing members into the juice. A centrifugal force of from 0.2 to 1.0 times the force of gravity has been given as an example. Gravity of course aids this centrifugal force in the discharge of the juice in the embodiments of the invention shown in the drawings.

It will of course be understood that the above particular description is by way of illustration and that changes, omissions, additions, substitutions and/or modifications may be made within the scope of the claims without departing from the spirit of the invention.

I claim:

1. In a machine for extracting oil and juice from juice-bearing materials simultaneously and separately, the combination comprising, two circular squeezing members having opposed surfaces, at least one of said surfaces being perforated, frame members rotatably supporting said squeezing members on obliquely opposed axes such that the opposed surfaces are convergent at one zone and divergent at another zone, means for feeding cut juice-bearing material between the squeezing members with the skin portion of said material engaging the opposed surfaces and the cut portions of said material directed radially outward, means for rotating said squeezing members on their axes to squeeze the juice-bearing material between the converging opposed surfaces, a juice collector beneath the squeezing members, a chamber behind at least one of the opposed surfaces on the squeezing members, said chamber having a fluid connection with said surface through the perforations in said surface, and means for reducing the pressure in said chamber to draw off oil through said perforations.

2. In a machine for extracting oil and juice from citrous fruits simultaneously and separately, the combination comprising, two opposed circular squeezing members having corrugated and perforated annular surfaces, said squeezing members being rotatably mounted on obliquely opposed axes such that their annular surfaces are convergent at one zone and divergent at a diametrically opposed zone, frame members rotatably mounted on axes angularly disposed to the axes of the squeezing members and rotatably supporting said squeezing members, resilient spacing means mounted on said frame members and adapted to permit limited pivoting of the frame members on their axes to vary the axial spacing between the opposed surfaces, resilient guide members circumferentially placed about said squeezing members, said guide members extending from a point at which the disc surfaces are substantially divergent to a point at which the annular surfaces of the squeezing members are closely convergent and adapted to guide objects being fed between the circular squeezing members so that portions of said objects are engaged with the annular surfaces of the squeezing members, means for feeding cut fruit sections between the squeezing members with the cut surfaces of the sections supported by said guide members, means for rotating said squeezing members to squeeze the fruit sections between the converging annular surfaces, a juice collector beneath the squeezing members, a pulp collector beneath the squeezing members circumferentially spaced with respect to the juice collector, chambers behind the annular surfaces having a fluid connection with the surfaces through the perforations in said annular surfaces, means for reducing the pressure in said chambers to draw off oil through said perforations, and wiper means cooperating with said squeezing members at a point of divergence of the annular surfaces, said wiper means acting to remove materials deposited on the annular surfaces and to discharge these materials from the machine.

3. In a machine for extracting oil and juice from citrous fruits simultaneously and separately, the combination comprising, circular squeezing members having opposed surfaces, at least one of said surfaces being perforated, frame members rotatably supporting said squeezing members on obliquely opposed axes such that their opposed surfaces are convergent at one zone and divergent at a diametrically opposed zone, means for feeding cut fruit between the squeezing members with the skin portion of said friut engaging the opposed surfaces and the cut portion of said fruit directed outwardly, means for rotating said squeezing members to squeeze the fruit between the converging opposed surfaces, a juice collector beneath the squeezing members, a chamber behind at least one opposed surface having a fluid connection with said surface through the perforations in said surface, and means for reducing the pressure in said chamber to draw off oil through said perforations.

4. In a machine for extracting oil and juice from citrous fruits simultaneously and separately, the combination comprising, a pair of circular squeezing members having opposed pressing surfaces, at least one of said surfaces being perforated, frame members for rotatably supporting said squeezing members on obliquely opposed axes such that their opposed surfaces are convergent at one zone and divergent at a diametrically opposed zone, means for feeding cut fruit between the squeezing members with the skin portion of said fruit engaging the opposed surfaces and the cut portion of said fruit directed outwardly, means for rotating said squeezing members to squeeze the fruit between the converging opposed surfaces, said rotating means imparting a speed to said squeezing members sufficient to generate a centrifugal force greater than 0.2 times the force of gravity and less than 1.0 times the force of gravity, a juice collector beneath the squeezing members, a chamber behind at least one opposed surface having a fluid connection with said surface through the perforations in said surface, and means for reducing the pressure in said chamber to draw off oil through said perforations.

5. In a machine for extracting oil and juice from citrous fruits simultaneously and separately, the combination comprising, circular squeezing members having opposed surfaces, at least one of said surfaces being perforated, frame members rotatably supporting said squeezing members on obliquely opposed axes such that their opposed surfaces are convergent at one zone and divergent at a diametrically opposed zone, means for feeding cut fruit between the squeezing members with the skin portion of said fruit engaging the opposed surfaces and the cut portion of said fruit directed outwardly, means for rotating said squeezing members to squeeze the fruit between the converging opposed surfaces, a juice collector beneath the squeezing members, chambers behind at least one opposed surface having fluid connections with said surface through the perforations in said surface, and means for reducing the pressure in at least one chamber closely adjacent to the zone of convergence of said opposed surfaces to draw off oil through said perforations.

6. In a machine for extracting oil and juice from fruits simultaneously and separately, the combination comprising, two opposed squeezing members having perforated annular surfaces, frame members rotatably supporting said squeezing members on obliquely opposed axes such that their annular surfaces are convergent at one zone and divergent at another zone, means tending to move said frame members out of alignment and to cause contact between the converging annular surfaces of the squeezing members, a slide for feeding fruit sections between the squeezing members so that the skin portions of these fruit sections are engaged by the annular surfaces of the squeezing members, means for rotating said squeezing members at equal speeds sufficient to generate only mild centrifugal force and to squeeze the fruit sections between the converging annular surfaces, a juice collector adjacent to the squeezing members at the zone of discharge of juice, chambers behind the annular surfaces having a fluid connection with said surfaces through the perforations in said surfaces, and means for reducing the pressure in said chambers to draw off oil through said perforations.

7. A rotary press assembly comprising a frame, a pair of juxtaposed yoke members mounted in said frame, a pair of circular pressure discs having opposed squeezing surfaces, said discs being journaled respectively on said yoke members, means for rotating said discs on their respective axes, a plurality of journals for the yoke members, an arm extending radially from each yoke member, a spring associated with said arms whereby pivoting of the yoke members in their journals is resiliently controlled, and means for feeding objects tangentially between the peripheries of said discs, whereby said objects are pressed between the discs.

8. A rotary press assembly comprising a frame; a pair of juxtaposed yoke members mounted in said frame; a pair of circular pressure discs having opposed squeezing surfaces; said discs being journaled respectively on said yoke members; means for rotating said discs on their respective axes; means for biasing said squeezing surfaces of the discs with respect to each other to provide a convergent zone and a diametrically opposite divergent zone between said surfaces, said biasing means comprising a pair of abutments on the frame, a spring adjustably mounted between each of said yoke members and the abutments, for urging the squeezing surfaces into biased relation to each other, and means for adjusting the tension of said springs; and means for feeding objects tangentially between the peripheries of said discs whereby said objects are pressed between the discs.

9. A rotary press assembly comprising a frame, a pair of juxtaposed yoke members mounted in said frame, a pair of circular pressure discs having opposed squeezing surfaces, said discs being journaled respectively on said yoke members, means for rotating said discs on their respective axes, means for biasing said squeezing surfaces of the discs with respect to each other to provide a convergent zone and a diametrically opposite divergent zone between said surfaces, means for feeding objects tangentially between the peripheries of said discs whereby said objects are pressed between the discs, an annular pressure surface on each of said discs, a plurality of walls associated with said pressure surfaces, said walls forming a hollow chamber on the reverse side of at least one of said discs, said chambers being in fluid communication with the pressure surfaces of the discs, a fluid conduit connecting a source of subatmospheric pressure to the hollow chambers, whereby liquid expressed from said objects into said chambers is removed therefrom, and means associated with the convergent zone of the discs for gravitationally collecting other liquids expressed from said objects.

10. A rotary press assembly comprising a frame, a pair of juxtaposed yoke members mounted in said frame, a pair of circular pressure discs having opposed squeezing surfaces, said discs being journaled respectively on said yoke members, means for rotating said discs on their respective axes, means for biasing said squeezing surfaces of the discs with respect to each other to provide a convergent zone and a diametrically opposite divergent zone between said surfaces, means for feeding objects tangentially between the peripheries of said discs whereby said objects are pressed between the discs, and a plurality of inter-pivoting links connected between the frame and the yokes for equalizing the pivotal movement of the yokes.

ARTHUR H. INGALLS.

REFERENCES CITED

The following references are of record in the file of this patent:

UNITED STATES PATENTS

| Number | Name | Date |
|---|---|---|
| 35,787 | Spencer | July 1, 1862 |
| 271,161 | Treber | Jan. 23, 1883 |
| 326,253 | Stiles | Sept. 15, 1885 |
| 1,092,800 | Rach | Apr. 7, 1914 |
| 1,146,575 | Johnson | July 13, 1915 |
| 1,764,158 | Edwards | June 17, 1930 |
| 1,970,540 | Benham | Aug. 21, 1934 |
| 2,146,158 | Scherer | Feb. 7, 1939 |
| 2,212,066 | Fry | Aug. 20, 1940 |
| 2,226,926 | Gordon | Dec. 31, 1940 |
| 2,235,745 | Gould | Mar. 18, 1941 |
| 2,247,190 | Edenfield | June 24, 1941 |
| 2,311,565 | Nelson | Feb. 16, 1943 |
| 2,337,211 | Barnby | Oct. 16, 1945 |